(12) United States Patent
Nachimuthu et al.

(10) Patent No.: US 9,342,394 B2
(45) Date of Patent: May 17, 2016

(54) SECURE ERROR HANDLING

(75) Inventors: Murugasamy Nachimuthu, Beaverton, OR (US); Mohan J. Kumar, Aloha, OR (US); Theodros Yigzaw, Sherwood, OR (US); Jose A. Vargas, Rescue, CA (US); Rajender Kuramkote, Newcastle, WA (US)

(73) Assignee: Intel Corporation, Santa Clara, CA (US)

( * ) Notice: Subject to any disclaimer, the term of this patent is extended or adjusted under 35 U.S.C. 154(b) by 333 days.

(21) Appl. No.: 13/997,301

(22) PCT Filed: Dec. 29, 2011

(86) PCT No.: PCT/US2011/067966
§ 371 (c)(1),
(2), (4) Date: Jun. 24, 2013

(87) PCT Pub. No.: WO2013/101122
PCT Pub. Date: Jul. 4, 2013

(65) Prior Publication Data
US 2014/0237299 A1   Aug. 21, 2014

(51) Int. Cl.
*G06F 11/00* (2006.01)
*G06F 11/07* (2006.01)
*G06F 11/36* (2006.01)
*G06F 21/57* (2013.01)

(52) U.S. Cl.
CPC ........ *G06F 11/0772* (2013.01); *G06F 11/3664* (2013.01); *G06F 11/0745* (2013.01); *G06F 21/57* (2013.01)

(58) Field of Classification Search
CPC .............................. G06F 21/57; G06F 11/0745
USPC .................................... 726/26, 34; 714/43, 48
See application file for complete search history.

(56) References Cited

U.S. PATENT DOCUMENTS

| T955,010 I4 | 2/1977 | Ragonese et al. |
|---|---|---|
| 5,493,668 A | 2/1996 | Elko et al. |
| 5,515,499 A | 5/1996 | Allen et al. |
| 6,304,984 B1 | 10/2001 | Neal et al. |
| 6,629,315 B1 | 9/2003 | Naylor |
| 6,636,991 B1 * | 10/2003 | Quach ............................ 714/52 |
| 6,725,317 B1 | 4/2004 | Bouchier et al. |

(Continued)

FOREIGN PATENT DOCUMENTS

| CN | 1542638 A | 11/2004 |
|---|---|---|
| CN | 1801740 A | 7/2006 |

(Continued)

OTHER PUBLICATIONS

Office Action received for Korean Patent Application No. 10-2011-7031359, mailed on Jun. 19, 2013, 5 pages of Office Action including 2 pages of English Translation.

(Continued)

*Primary Examiner* — Aravind Moorthy
(74) *Attorney, Agent, or Firm* — International IP Law Group, P.L.L.C.

(57) ABSTRACT

Various embodiments are described herein. Some embodiments include an Operating System and a platform. The platform includes a processor having an error register. The Operating System can write to the error register only via the platform in a secure manner (for example, using platform firmware). Other embodiments are described and claimed.

22 Claims, 4 Drawing Sheets

(56) References Cited

U.S. PATENT DOCUMENTS

| | | |
|---|---|---|
| 6,728,668 B1 | 4/2004 | Kitamorn |
| 6,990,545 B2 | 1/2006 | Arimilli et al. |
| 7,130,951 B1 | 10/2006 | Christie et al. |
| 7,386,662 B1 | 6/2008 | Kekre et al. |
| 7,640,453 B2 | 12/2009 | Li et al. |
| 2002/0194389 A1 | 12/2002 | Worley et al. |
| 2003/0041232 A1 | 2/2003 | McDaniel |
| 2003/0093579 A1 | 5/2003 | Zimmer et al. |
| 2004/0098575 A1 | 5/2004 | Datta et al. |
| 2004/0133710 A1 | 7/2004 | Sathe |
| 2004/0215865 A1 | 10/2004 | Arimilli et al. |
| 2005/0114687 A1 | 5/2005 | Zimmer et al. |
| 2005/0144414 A1 | 6/2005 | Yamamoto et al. |
| 2006/0075312 A1 | 4/2006 | Fischer |
| 2006/0184480 A1 | 8/2006 | Ayyar et al. |
| 2006/0242379 A1 | 10/2006 | Korgaonkar et al. |
| 2007/0061372 A1 | 3/2007 | Appavoo et al. |
| 2007/0061634 A1 | 3/2007 | Marisetty et al. |
| 2007/0226795 A1 | 9/2007 | Conti et al. |
| 2008/0098211 A1 | 4/2008 | Maeda |
| 2008/0126650 A1 | 5/2008 | Swanson |
| 2008/0288815 A1 | 11/2008 | Kumar et al. |
| 2008/0307082 A1 | 12/2008 | Cai et al. |
| 2009/0006829 A1 | 1/2009 | Cai et al. |
| 2009/0125685 A1 | 5/2009 | Bayer et al. |
| 2009/0125716 A1 | 5/2009 | Wooten |
| 2009/0193199 A1 | 7/2009 | Averill et al. |
| 2009/0287900 A1 | 11/2009 | Kirscht et al. |
| 2009/0293132 A1* | 11/2009 | Henry et al. ............. 726/27 |
| 2010/0281222 A1 | 11/2010 | Liu et al. |
| 2011/0154023 A1* | 6/2011 | Smith et al. ............. 713/155 |
| 2011/0161592 A1 | 6/2011 | Nachimuthu et al. |
| 2011/0179311 A1 | 7/2011 | Nachimuthu et al. |
| 2012/0084628 A1* | 4/2012 | Cox ............. G06F 11/167 714/763 |
| 2012/0131389 A1* | 5/2012 | Chakradhar et al. ....... 714/47.1 |

FOREIGN PATENT DOCUMENTS

| | | |
|---|---|---|
| JP | 63-140342 | 11/1988 |
| JP | 2000-259586 A | 9/2000 |
| JP | 2004-178016 A | 6/2004 |
| JP | 2006-515940 A | 6/2006 |
| WO | 2011/081840 A2 | 7/2011 |
| WO | 2011/081840 A3 | 11/2011 |
| WO | 2013/101122 A1 | 7/2013 |

OTHER PUBLICATIONS

Notice of Allowance and Search Report received for Chinese Patent Application No. 201080025194.0, mailed on Aug. 8, 2014, 7 pages of Notice of Allowance and Search Report including 3 pages of English Translation.

Office Action and Search Report received for Chinese Patent Application No. 201080025194.0, mailed on Sep. 30, 2013, 9 pages of Office Action and Search Report including 4 pages of English Translation.

Office Action received for Japanese Patent Application No. 2012-516396, mailed on May 14, 2013, 4 pages of Office Action including 2 pages of English translation.

Hagemeyer et al., "Dedicated Module Access in Dynamically Reconfigurable Systems", 20th International Parallel and Distributed Processing Symposium (IPDPS), IEEE 2006, 8 pages.

Intel, "An Introduction to the Intel QuickPath Interconnect", Jan. 2009.

International Preliminary Report on Patentability and Written Opinion received for PCT Patent Application No. PCT/US10/59815, mailed on Jul. 12, 2012, 6 pages.

International Search Report and Written Opinion received for PCT Patent Application No. PCT/US2010/059815, mailed on Sep. 27, 2011, 8 pages.

International Preliminary Report on Patentability and Written Opinion received for PCT Patent Application No. PCT/US2011/067966, mailed on Jul. 10, 2014, 6 pages.

International Search Report and Written Opinion received for PCT Patent Application No. PCT/US2011/067966, mailed on Aug. 31, 2012, 9 pages.

Supplementary European Search Report for European Application EP 11878816 dated Aug. 24, 2015.

* cited by examiner

SECURE ERROR HANDLING

RELATED APPLICATION

This application is related to U.S. patent application Ser. No. 12/971,868 entitled "INJECTING ERROR AND/OR MIGRATING MEMORY IN A COMPUTING SYSTEM" filed on Dec. 17, 2010. This application describes an implementation for real error injection.

TECHNICAL FIELD

The inventions generally relate to secure error handling.

BACKGROUND

Server systems (especially expandable scalable and mission critical systems) have been built with error detection, error correction, error recovery and error logging capabilities for a better Reliability, Availability and Serviceability (RAS) experience.

Machine Check Architecture (MCA) is a mechanism used in Intel Xeon® processors to report processor related errors to upper layer software. The Machine Check Architecture has typically been limited to processor component related errors such as cores, caches, etc. With integration of a memory controller, PCIe root complex, etc. into the Xeon® Processor Socket, however, the scope of the Machine Check Architecture has been reported to comprehend error handling and RAS events from all these components. Another advance in the Machine Check Architecture is error recovery, where the errors that are uncorrectable from a processor/platform standpoint are provided to the Operating System (OS) or the Virtual Machine Monitor (VMM) for recovery.

In light of the above innovations, it is important for Operating System Vendors (OSVs) and/or Virtual Machine Vendors (VMVs) to verify comprehensively that error handling, error reporting and error recovery on platforms work as expected by the Operating System (OS) and/or Virtual Machine Monitor (VMM). This is referred to as RAS/error handling code coverage. The code coverage allows for the OS and/or VMM to ensure that the error handling, recovery and RAS features do indeed work end-to-end. This involves generating different type of errors such as errors on different processor cores, processor caches, memory, input/output devices, system interconnects, etc. In order to verify error handling capabilities the error injection capability needs to be available to the OS and/or VMM at runtime on a production platform. For hardware to implement real error injection mechanism on various error subsystems and for all the error cases, it is very complex and very expensive. Additionally, the error injection mechanism itself should not pose a risk to the security of the system.

Error handling code is currently validated with a limited set of real error injections. The real error injection mechanisms allow injecting only one error at a time. Therefore, the error handling code gets only limited error code execution coverage. It is then necessary to perform many manual code reviews in order to determine additional code coverage paths.

Some previous implementations allow writing MCA banks from ring0 code by writing to another ring0 code accessible register. This is a security hole. Since the MCA bank write enabling register is in the ring0 domain, any ring0 code can go and enable the MCA bank write capability and write to the MCA bank and cause unwanted error cases. Further, no previous implementations provide for signaling of errors such as Machine Check Architecture (MCA) and Corrected Machine Check Error Interrupt (CMCI), limiting the feature usefulness of the implementation.

The present inventors have additionally identified that current solutions do not provide protection of MCA bank write enabling/disabling capability, or protection of error signaling (MCA/CMCI) generation enabling/disabling.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Some embodiments of the inventions relate to secure error handling.

In some embodiments, error injection for machine check error code coverage is secure and efficient to implement (for example, in some embodiments for Intel server processors and/or Intel Xeon® processors).

Some embodiments include an Operating System, a Basic Input/Output System including System Management Mode (SMM) control (and/or SMM functionality and/or SMM firmware, for example), and a processor including an error register. The Operating System can only write to the error register via the System Management Mode control, functionality, firmware, etc.

Some embodiments include an Operating System and a platform including a processor. The processor includes an error register. The Operating System can only write to the error register in a secure manner via the platform. In some embodiments, the Operating System can only write to the error register in a secure manner via platform firmware.

Figure 1:
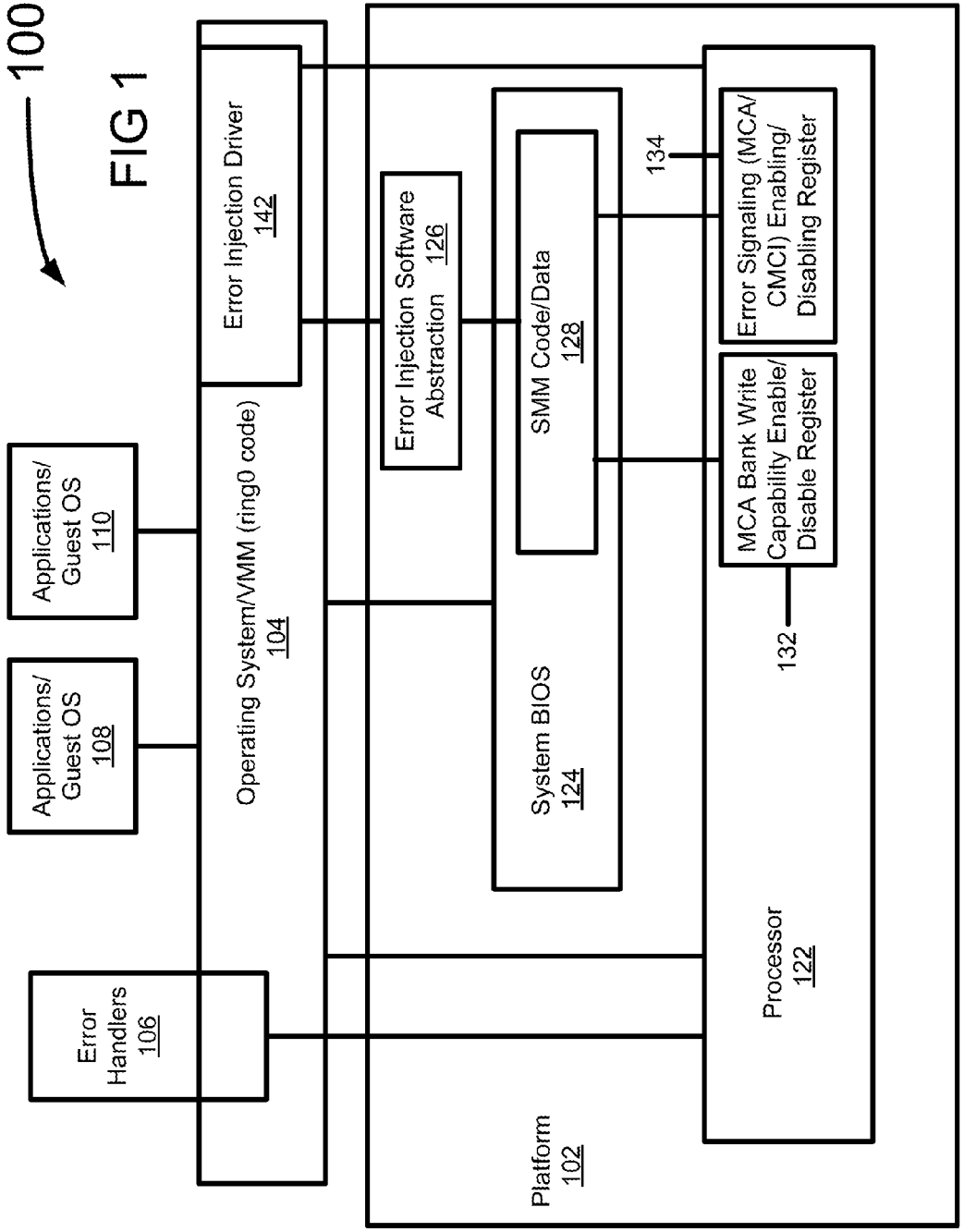
FIG. 1 illustrates a system according to some embodiments of the inventions.

FIG. 1 illustrates a system 100 according to some embodiments. In some embodiments system 100 includes a platform 102, an Operating System/Virtual Machine Monitor (or ring0 code) 104, error handlers 106, applications/Guest Operating System 108, and applications/Guest Operating System 110. In some embodiments, platform 102 includes a processor (and/or processor hardware) 122, system Basic Input Output System (BIOS) 124, and error injection software abstraction 126. In some embodiments, system BIOS 124 includes System Management Mode (SMM) Code/Data 128 (and/or SMM control, SMM functionality, an SMM controller, etc). In some embodiments, SMM code/date is implemented in firmware. In some embodiments, processor 122 includes Machine Check Architecture (MCA) Bank Write Capability Enable/Disable register 132 and error signaling Machine Check Architecture (MCA)/Corrected Machine Check Error Interrupt (CMCI) Enable/Disable Register 134.

In some embodiments, processor 122 can enable or disable writing to the MCA memory banks. In some embodiments, processor 122 can signal an error as a Model Specific Register (MSR) or a Configuration Space Register (CSR). According to some embodiments, the enable/disable registers 132 and 134 in processor 122 are only accessible from the System Management Mode (SMM). This ensures that no Operating System (OS) code can enable the feature without going directly through the trusted SMM code.

In some embodiments, writing to the MCA banks is implemented from the ring0 code 104. In some embodiments, the ring0 code 104 is able to signal MCA/CMCI. In some embodiments, the MCA bank write capability is only enabled and/or disabled from the System Management Mode (SMM), providing security for the use of the feature. In some embodiments, Error Signaling (MCA/CMCI) is enabled and/or disabled only from the SMM, providing security for the use of the feature. In some embodiments, the Operating System (OS) detects the availability of secure error injection for code coverage. In some embodiments, software abstraction of error injection functionalities to the OS as a BIOS/OS interface is implemented.

Figure 2:
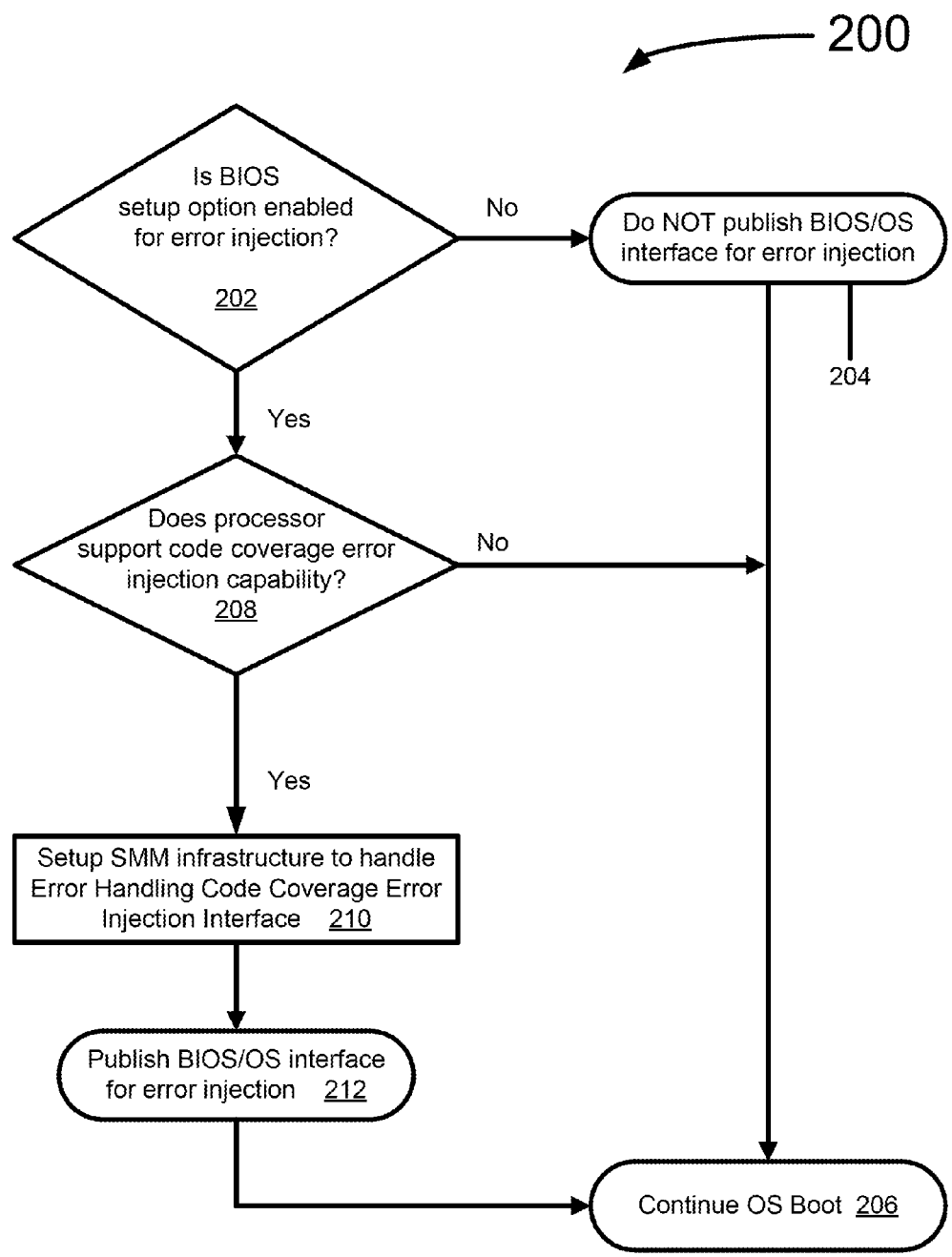
FIG. 2 illustrates a flow according to some embodiments of the inventions.

FIG. 2 illustrates a flow 200 according to some embodiments. In some embodiments, flow 200 illustrates a BIOS flow for publishing the BIOS/OS interface. In some embodiments, flow 200 illustrates a BIOS code flow during a boot process, where feature availability in the platform and/or processor is identified, and a BIOS/OS interface (such as ACPI table/methods or Advanced Configuration and Power Interface table/methods) is published. In some embodiments, flow begins at 202 where a determination is made as to whether the BIOS setup option is enabled for error injection. If it is determined at 202 that the BIOS setup option is not enabled for error injection, then the BIOS/OS interface for error injection is not published at 204, and flow moves to 206 to continue the OS boot process. If it is determined at 202 that the BIOS setup option is enabled for error injection, then a determination is made at 208 as to whether the processor supports code coverage error injection capability at 208. If it is determined at 208 that the processor does not support code coverage error injection capability, flow moves to 206 to continue the OS boot process. If it is determined at 208 that the processor does support code coverage error injection capability, an SMM infrastructure is set up at 210 to handle an Error Handling Code Coverage Error Injection Interface. The BIOS/OS interface for error injection is then published at 212, and flow then moves to 206 to continue the OS boot process.

Figure 3:
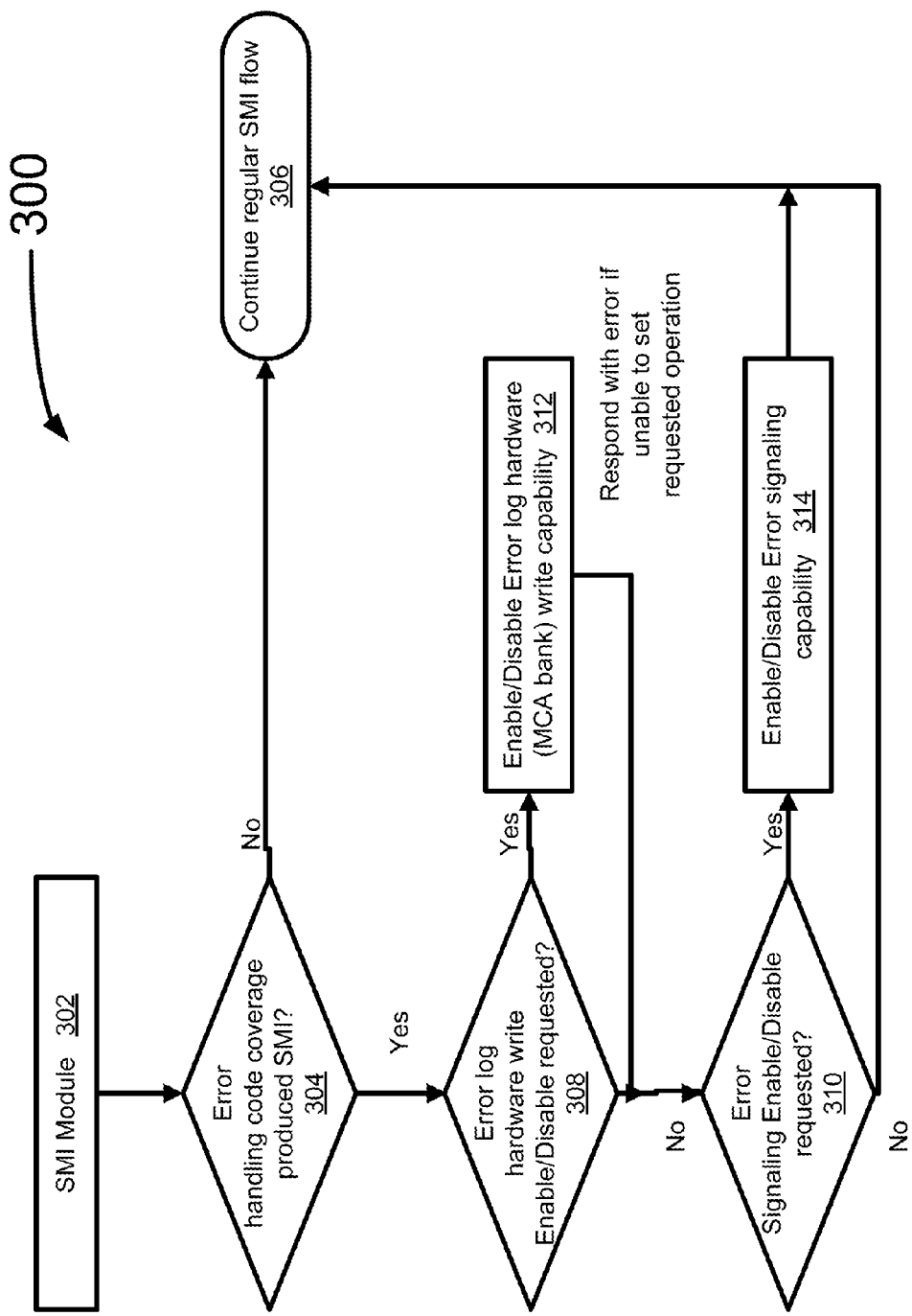
FIG. 3 illustrates a flow according to some embodiments of the inventions.

FIG. 3 illustrates a flow 300 according to some embodiments. In some embodiments, flow 300 illustrates a System Management Mode (SMM) code flow for enabling/disabling writing error log/error signaling hardware. In some embodiments, flow 300 illustrates action taken by SMM code when the OS calls the BIOS/OS interface to enable/disable MCA bank write capability and error signaling capability.

In some embodiments, flow 300 begins at a System Management Interrupt (SMI) module at 302. At 304 a determination is made as to whether the SMI is an error handling code coverage produced SMI. If it is not an error handling code coverage produced SMI at 304, then the regular SMI flow is continued at 306. If it is an error handling code coverage produced SMI at 304, then a determination is made at 308 as to whether an error log hardware enable and/or disable is desired. If an error log hardware enable and/or disable is not desired at 308, then flow moves to 310 where a determination is made to determine an error signaling enable/disable. If an error log hardware enable and/or disable is desired at 308, enabling/disabling of error log hardware (MCA bank) write capability is performed at 312, and responding with an error if the flow is unable to set the requested operation before flow moves to 310. If no error signaling enable/disable is determined at 310, then the regular SMI flow is continued at 306. If error signaling enable/disable is determined at 310, then enabling/disabling of the error signaling capability is performed at 314, and the regular SMI flow is continued at 306.

Figure 4:
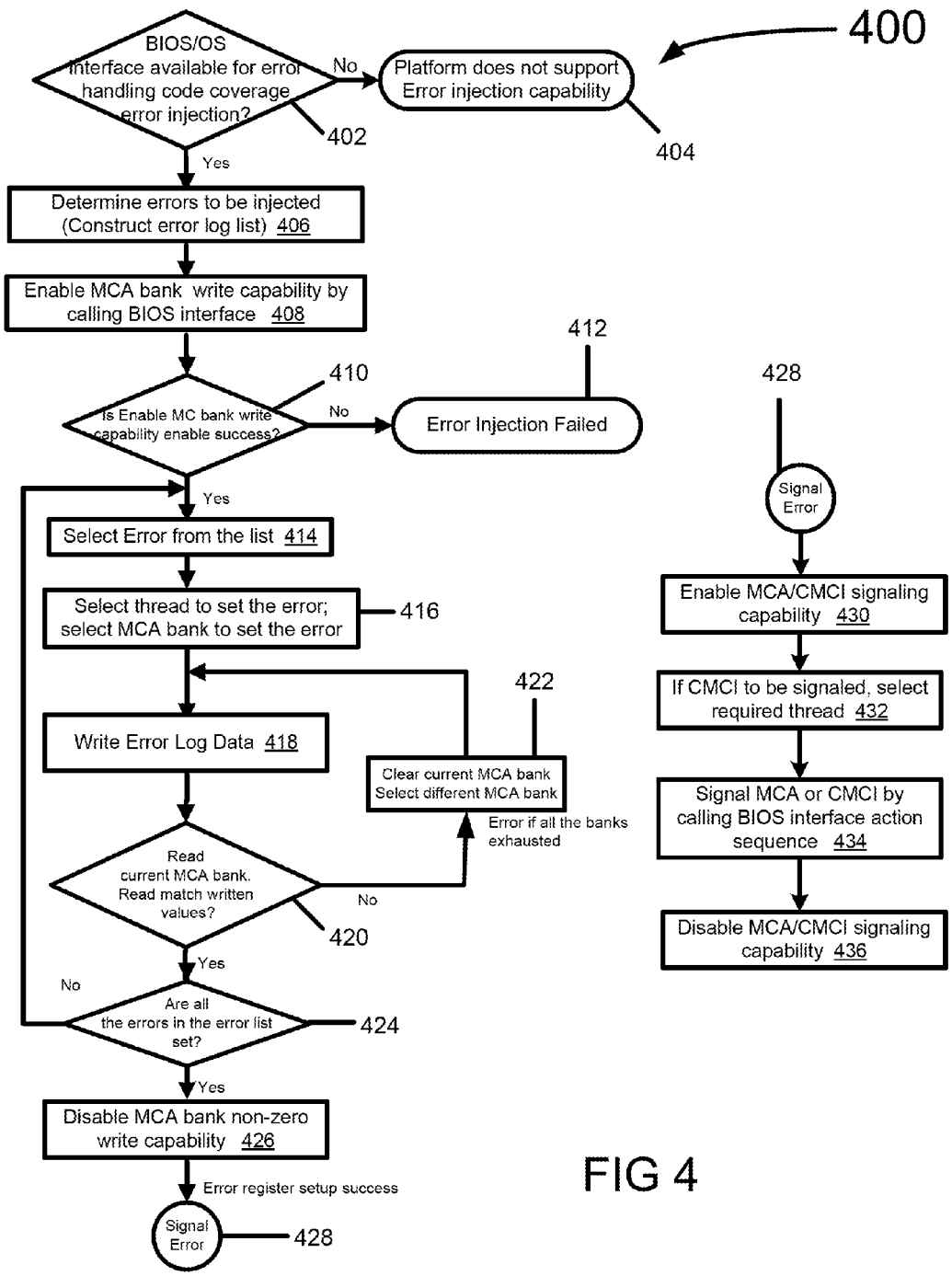
FIG. 4 illustrates a flow according to some embodiments of the inventions.

FIG. 4 illustrates a flow 400 according to some embodiments. In some embodiments, flow 400 illustrates an OS flow for injecting an error. In some embodiments, flow 400 illustrates how an OS consumes the BIOS/OS interface and injects error into the system according to some embodiments.

Flow 400 begins at 402, where a determination is made as to whether a BIOS/OS interface is available for error handling code coverage error injection. If a BIOS/OS interface is not available for error handling code coverage error injection at 402, then a determination is made at 404 that the platform does not support error injection capability (for example, does not support MCA bank error injection capability). If a BIOS/OS interface is available for error handling code coverage error injection at 402, then errors to be injected are determined at 406 (for example, by constructing an error log list). The MCA bank write capability is then enabled at 408 by calling a BIOS interface (and/or an ACPI interface). At 410 a determination is made as to whether MCA bank write capability is successful. If not, the error injection failed at 412. If so, the error is selected from a list at 414. The thread to set the error is selected and the MCA bank to set the error is selected at 416. Error log data is then written at 418. At 420 the current MCA bank is read and a determination is made as to whether the read matches written values. If not, there is an error if all the banks are exhausted, and the current MCA bank is cleared and a different MCA bank is selected at 422, before flow is returned to 418. If the read matches written values at 420, a determination is made at 424 as to whether all errors are in the error list set. If not, flow is returned to 414. If so, MCA bank non-zero write capability is disabled at 426 by calling the BIOS interface (and/or the ACPI interface). This indicates a successful error registration setup and an error is signaled at 428. MCA/CMCI signaling capability is then enabled at 430 by calling the BIOS interface (and/or ACPI interface). Then at 432 if the CMCI is to be signaled, the required thread is selected. Then an MCA or CMCI is signaled at 434 (for example, by calling a BIOS interface action sequence). MCA/CMCI signaling capability is then disabled at 436.

Runtime context of the Basic Input/Output System (BIOS) is System Management Interrupt (SMI), and under this execution context, the BIOS may not be able to signal a MCA. This implementation provides for enables for MCA Bank writing (Error Register writing) and MCA/CMCI signaling control register to be under SMI control. It also allows for the OS/VMM to write to trigger signaling of MCA or CMCI once MCA/CMCI signaling is enabled. These details are abstracted by the BIOS interface so that the OS/VMM do not have to be aware of the implementation details.

In some embodiments, where trusted platform execution (TXT) is enabled, the control registers for writing MC bank registers and control registers for enabling of MCA/CMCI signaling are disabled until SMI itself is within the trusted compute boundary (TCB). This allows for other embodiments implemented in such trusted environments.

In some embodiments, the OS/driver determines that it is ready to perform error injection for code coverage. The OS/driver then calls the BIOS interface to enable the MCA bank write capability. At this point the OS/driver (ring0 code) writes to the MCA banks. The error handling code coverage validation driver determines the errors that it is interested in validating and constructs error log values for various MCA banks and threads. The validation driver writes the error logs to the selected MCA banks and threads. Then, based on the error type, it signals CMCI or MCA, for example. Once the error is signaled, the interrupt causes the error handler to be invoked, and the error handler thinks that it received a real error and handles the error normally. It is not necessary to modify the error handler code in order to validate the error handling code path. Error injection according to some embodiments is implemented in a manner where errors on multiple MCA banks and threads are created before signaling an error. In this manner, simultaneous error scenarios may be created.

According to some embodiments, since MCA bank enable and/or disable, and error signaling controls are within the System Management Mode (SMM) and no data is exposed during error injection, no security holes are exposed.

In some embodiments, different types of errors are set on different MCA banks, different Central Processing Unit (CPU) or processor threads, and/or on different CPU or processor sockets before signaling the error. This enables execution of different error handler code flow, and creates different error scenarios that were not previously possible. Creation of these types of scenarios allows for verifying of a variety of corner cases in error handling flow.

In some embodiments, MCA bank writing and error signaling features are allowed only from System Management Mode (SMM). SMM architecture provides security to the platform because SMM code or data cannot be accessed outside the SMM. This ensures that no malware or un-trusted code can get into the SMM and enable those features.

Some previous implementations allow writing MCA banks from ring0 code by writing to another ring0 code accessible register. This is a security hole. Since the MCA bank write enabling register is in the ring0 domain, any ring0 code can go and enable the MCA bank write capability and write to the MCA bank and cause unwanted error cases. Further, no previous implementations provide for signaling of errors such as MCA and CMCI, limiting the feature usefulness of the implementation.

Current solutions do not provide protection of MCA bank write enabling/disabling capability, or protection of error signaling (MCA/CMCI) generation enabling/disabling. According to some embodiments, protection is provided for enabling MCA bank write capability and error signaling capability. In some embodiments, software abstraction of the MCA bank write capability and error signaling capability enabling/disabling is implemented. In some embodiments, if the hardware changes, the error handling code coverage error injection does not need to change.

In some embodiments, enabling and/or disabling of MCA bank writing is implemented (error logging hardware writing). In some embodiments, use of error signaling hardware is protected. In some embodiments, abstraction of a hardware implementation to software is implemented so that no changes to the software are necessary if the hardware implementation register or location changes.

In some embodiments, an Operating System Vendor (OSV) can validate error handling flows, and OS implementations of RAS on processors (for example, server processors and/or Intel Xeon® processors) will have better quality. This reduces the cost of enabling RAS/error handling. According to some embodiments, any error combination may be populated in the MCA banks, allowing for the OS to validate future feature error handling even before silicon is available, and in a secure manner.

Although some embodiments have been described herein as being implemented in a particular manner, according to some embodiments these particular implementations may not be required. For example, some embodiments have been described herein as including System Management Mode (SMM) code/data, SMM functionality, SMM control, and SMM controller, etc. However, other embodiments need not implement SMM. Additionally, in some embodiments, some functionality such as SMM, BIOS, etc. may be implemented in firmware, software, and/or hardware. In some embodiments, platform control of enabling/disabling error registers and/or of detecting, correcting, recovering, logging, etc. of errors is implemented in a secure manner rather than controlling such functionality using the Operating System (OS) and/or Virtual Machine Monitor (VMM), for example.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus comprising:
   an operating system; and
   a platform comprising a basic input/output system and a hardware processor, the hardware processor comprising an error register;
   wherein the operating system is to write in a secure manner to the error register via the basic input/output system, and the basic input/output system is to enable or disable error signaling between the operating system and the hardware processor based on support in the hardware processor for a code coverage error injection capability.

2. The apparatus of claim 1, the platform further comprising system management mode functionality, wherein the operating system is to write to the error register in a secure manner via the system management mode functionality.

3. The apparatus of claim 2, wherein the basic input/output system comprises the system management mode functionality.

4. The apparatus of claim 1, wherein the operating system is to write in a secure manner to the error register via platform firmware.

5. The apparatus of claim 1, wherein the error register comprises at least one of a machine check architecture register and an error signaling register.

6. The apparatus of claim 1, wherein the error register is enabled and/or disabled via the platform.

7. The apparatus of claim 1, wherein the error register is a machine check architecture register that is enabled and/or disabled only by the platform.

8. The apparatus of claim 1, wherein the platform is to control error signaling between the operating system and the hardware processor.

9. The apparatus of claim 1, wherein the error register is a machine check architecture register that is controlled by the platform, and the hardware processor further comprises an error signaling register that is controlled by the platform.

10. The apparatus of claim 1, wherein the operating system is to write to the error register via the platform.

11. The apparatus of claim 1, wherein error injection is implemented via the platform.

12. A method comprising:
   enabling or disabling error signaling between an operating system and a hardware processor based on support in the hardware processor for a code coverage error injection capability; and
   writing to an error register in the hardware processor from the Operating System via the basic input/output system in a secure manner.

13. The method of claim 12, further comprising writing in a secure manner to the error register included in the hardware processor from the operating system via system management mode functionality included in the platform.

14. The method of claim 13, wherein the basic input/output system of the platform comprises the system management mode functionality.

15. The method of claim 12, further comprising writing from the operating system to the error register in a secure manner via platform firmware.

16. The method of claim 12, wherein the error register comprises at least one of a machine check architecture register and an error signaling register.

17. The method of claim 12, further comprising enabling and/or disabling the error register via the platform.

18. The method of claim 12, wherein the error register is a machine check architecture register, further comprising enabling and/or disabling the machine check architecture register only by the platform.

19. The method of claim 12, further comprising controlling error signaling between the operating system and the processor via the platform.

20. The method of claim 12, wherein the error register is a machine check architecture register, further comprising controlling the machine check architecture register and an error signaling register in the hardware processor by the platform.

21. The method of claim 12, further comprising writing from the operating system to the error register via the platform.

22. The method of claim 12, further comprising injecting one or more error via the platform.

* * * * *